United States Patent
Vallius (10) Patent No.: US 8,190,802 B2
(45) Date of Patent: May 29, 2012

(54) CIRCUIT, METHOD AND ARRANGEMENT FOR IMPLEMENTING SIMPLE AND RELIABLE DISTRIBUTED ARBITRATION ON A BUS

(75) Inventor: Tero Vallius, Oulu (FI)

(73) Assignee: Atomia Oy (FI)

( * ) Notice: Subject to any disclaimer, the term of this patent is extended or adjusted under 35 U.S.C. 154(b) by 617 days.

(21) Appl. No.: 12/310,458

(22) PCT Filed: Aug. 24, 2007

(86) PCT No.: PCT/FI2007/000210
§ 371 (c)(1),
(2), (4) Date: Feb. 25, 2009

(87) PCT Pub. No.: WO2008/023091
PCT Pub. Date: Feb. 28, 2008

(65) Prior Publication Data
US 2009/0319709 A1    Dec. 24, 2009

(30) Foreign Application Priority Data
Aug. 25, 2006   (FI) ................................ 20060767

(51) Int. Cl.
*G06F 13/36* (2006.01)
(52) U.S. Cl. ........................ 710/113; 370/462
(58) Field of Classification Search .......... 710/107–125; 370/364, 462
See application file for complete search history.

(56) References Cited

U.S. PATENT DOCUMENTS

| | | | |
|---|---|---|---|
| 5,111,424 A | 5/1992 | Donaldson | |
| 5,160,922 A * | 11/1992 | DeRosa et al. | 710/107 |
| 5,404,538 A * | 4/1995 | Krappweis, Sr. | 710/264 |
| 5,430,848 A | 7/1995 | Waggener | |
| 5,437,042 A * | 7/1995 | Culley et al. | 710/28 |
| 5,455,912 A * | 10/1995 | Ludwig | 710/113 |
| 5,455,917 A * | 10/1995 | Holeman et al. | 710/107 |
| 5,579,486 A * | 11/1996 | Oprescu et al. | 710/107 |

(Continued)

FOREIGN PATENT DOCUMENTS

| | | |
|---|---|---|
| EP | 06060018 | 3/1994 |
| WO | WO 2007/122547 | 11/2007 |

OTHER PUBLICATIONS

National Instruments. VME-GPID Installation and User Guide. Mar. 2003.*
Intersil. 82C89 CMOS Bus Arbiter. Data Sheet. Feb. 27, 2006.*
Philips Semiconductors. The I2C-bus Specification. Version 2.1. Jan. 2000.*
VMEbus Specification Manual. Revision C.1. Oct. 1985.*

(Continued)

*Primary Examiner* — Matthew Spittle
(74) *Attorney, Agent, or Firm* — Wood, Phillips, Katz, Clark & Mortimer (57) ABSTRACT

An arbitrator circuit for accessing a bus comprises a logic gate arrangement (406), one input of which is coupled to a first bus line. The circuit comprises a switching arrangement (404, 405, 407). As a response to a control signal the switching arrangement disconnects a first half (402) of the first bus line from a second half (403), and couples the second half (403) to a first fixed potential. A second bus line (401) is decoupled from the logic gate arrangement (406), which is coupled to receive a second fixed potential. The second bus line is coupled to the first fixed potential. Two sources are available for providing the control signal to the switching arrangement (404, 405, 407). One of them is the output of the logic gate arrangement (406).

17 Claims, 5 Drawing Sheets

U.S. PATENT DOCUMENTS

| | | | |
|---|---|---|---|
| 5,862,356 A | | 1/1999 | Normoyle |
| 5,931,924 A | * | 8/1999 | Arimilli et al. ............... 710/41 |
| 5,933,648 A | * | 8/1999 | Landolf et al. .............. 710/240 |
| 6,141,713 A | * | 10/2000 | Kang .............................. 710/107 |
| 6,167,478 A | * | 12/2000 | Bacigalupo ................... 710/240 |
| 6,327,696 B1 | | 12/2001 | Mahajan |
| 6,587,905 B1 | * | 7/2003 | Correale et al. ............. 710/107 |
| 6,948,019 B2 | * | 9/2005 | Stuber et al. ................. 710/240 |
| 7,165,133 B2 | * | 1/2007 | Takeuchi et al. ............. 710/110 |
| 7,330,924 B1 | * | 2/2008 | Kao et al. ..................... 710/305 |
| 2011/0022754 A1 | * | 1/2011 | Cidon et al. .................. 710/107 |

OTHER PUBLICATIONS

Corrigan, Steve. Introduction to the Controller Area Network (CAN). Application Report. Jul. 2008.*

The 12C-bus Specification (Phillips Semiconductors) Sep. 14, 2003 http://web.archive.org/web/20030914080014http://ww/semiconductors.phillips.com/acrobat/literature/9398/39340111.pdf.

* cited by examiner

CIRCUIT, METHOD AND ARRANGEMENT FOR IMPLEMENTING SIMPLE AND RELIABLE DISTRIBUTED ARBITRATION ON A BUS

TECHNICAL FIELD

The invention concerns generally the technology of arranging communications between multiple electronic circuit through a bus. Especially the invention concerns the technology of bus access and arbitration without any centralized arbitrator.

BACKGROUND OF THE INVENTION

Bus arbitration means a systematic way of deciding, which of a number of contending nodes is allowed to transmit on a bus, and making the contending nodes act in accordance with the decision. There are two basic approaches to bus arbitration. Centralized arbitration involves a centralized decision-making entity, which grants the nodes turns for accessing the bus according to need. Distributed arbitration relies on the nodes' own ability to detect contention situations and to react accordingly. Examples of centralized arbitration are known from the standardized PCI (Peripheral Component Interconnect) and VMEbus (Versa Module Eurocard bus) solutions. Known parallel bus standards with distributed arbitration include NuBus and MultiBus II, and known serial bus standards with distributed arbitration include the i2c (or IIC; Inter-Integrated Circuit), CAN (Controller Area Network), and LIN (Local Interconnect Network).

Figure 1:
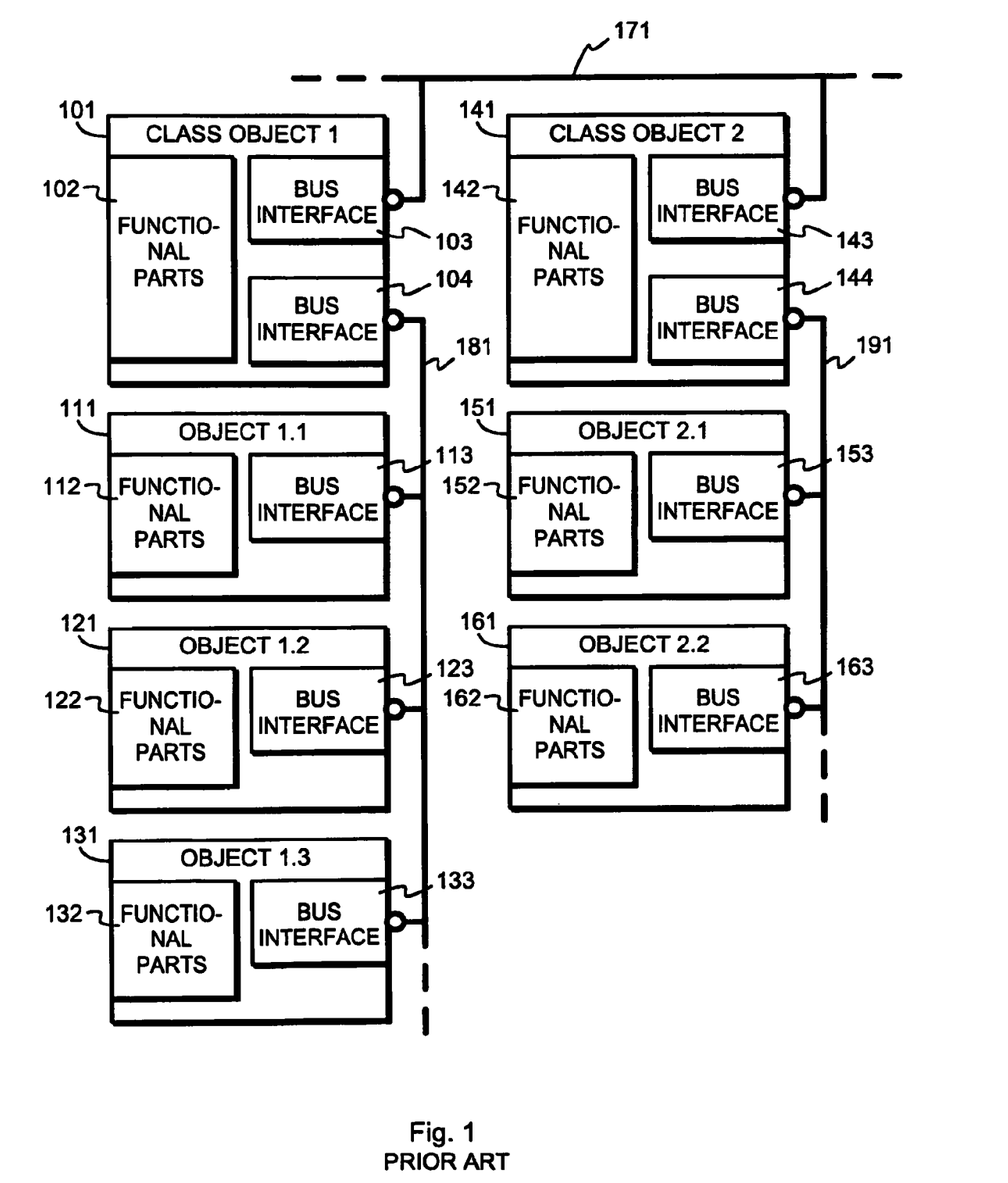
FIG. 1 illustrates a modular and object-oriented device architecture.

FIG. 1 illustrates an exemplary environment where bus arbitration will be needed. This example is known from publication T. Vallius and J. Roning: "ATOMI II—Framework for easy building of object oriented embedded systems", proceedings of 9th Euromicro Conference on Digital System Design, Architectures, Methods and Tools, Cavtat, Croatia, Aug. 30-Sep. 1, 2006 as the EOC (Embedded Object Concept) and it is particularly suitable for building embedded systems in a modular and object-oriented manner from blocks. A class object, like those illustrated with reference designators 101 and 141, represents on a logical level a whole class of objects. In the first object class there are the class object 101 and the objects illustrated with reference designators 111, 121, and 131. In the second object class there are the class object 141 and the objects illustrated with reference designators 151 and 161. Each class object and object is assumed to contain some functional parts 102, 112, 122, 132, 142, 152, and 162 respectively. A first bus 171 links the class objects to each other. For this purpose each class object 101 and 141 has a first bus interface 103 and 143 respectively. Within each class there is a class-specific bus, of which buses 181 and 191 are shown. The class object and the objects of the class all contain a bus interface for connecting them to the appropriate bus; see bus interfaces 104, 113, 123, 133, 144, 153, and 163 respectively. Bus-specific arbitration is needed separately on each of the buses 171, 181, and 191.

An essential feature of centralized arbitration is the fact that it is not scalable to a higher number of nodes than a certain relatively low limit, because it requires an individual arbitration connection from each node to the decision-making device. The modular, object-oriented architecture of FIG. 1 is freely scalable in respect of both the number of object classes and the number of objects in a class, which makes distributed arbitration the only plausible alternative.

Several basic approaches are known for distributed arbitration. The designation "open-collector gates" refers to a system in which one of the digital states of a bus line is the so-called weak state, while the other is the forced state. Typically a high voltage state is weak and the low voltage state is forced. Two simultaneous settings on such a bus line will always result in the bus line assuming the forced state. Each transmitting node monitors the results of the transmissions on the bus line. If a transmitting node attempted to set the bus line to the weak state but finds the bus line in the forced state instead, it knows that another node is also transmitting and reacts by ceding the bus and trying again later. The drawback of open-collector gates is the increasing energy consumption as a function of the number of nodes. The more nodes there are, the more power is needed to pull the voltage on the bus line to the forced state against the inverse effect of the pull-up resistors in the other nodes.

Daisy chaining refers to drawing a common arbitration line through all possible masters of the bus. An access request goes through every master, which can forward or stop it. As a drawback, many daisy chain solutions require relatively complicated arbitration logic in each node. A token ring approach is conceptually somewhat related to daisy chaining and involves circulating a transmission-authorising token among the nodes.

In carrier sense multi-access/collision detection (CSMA/CD) the nodes listen to the bus and only begin transmitting if the bus appears to be free. Every now and then two or more nodes begin their transmissions simultaneously, which results in a collision. Each node waits a random time after a collision before trying again. A lot of bus capacity is easily lost especially if there continuously many masters competing for the bus. Time sliced arbitration or time division arbitration means making predetermined allocations about transmission turns. It requires the nodes to have access to a common clock, and wastes capacity in those cases where the actual transmission activity is not evenly distributed among nodes.

SUMMARY OF THE INVENTION

An objective of the present invention is to present a circuit, a method and an arrangement for distributed bus arbitration in a simple and reliable manner that has good scalability. Another objective of the invention is to enable re-using at least some of the arbitration lines to other purposes. A further objective of the invention is to only require a very simple control connection from a controller unit to the bus arbitration unit. Yet another objective of the invention is to make the arbitration principle easily applicable to different kinds of bus architectures.

The objectives of the invention are achieved with a solution in which one arbitration line conveys reservation attempts between nodes and another arbitration line implements priority among the nodes that are coupled to the bus. A node keeps its arbitration circuit inactive until it needs to reserve the bus. Once activated, the arbitration circuit reacts to the bus being free by attempting reservation. Relative location along the priority line decides the winner among the contending nodes making simultaneous reservation attempts.

A circuit according to the invention is characterised by the features recited in the characterising part of the independent claim directed to a circuit.

A method according to the invention is characterised by the features recited in the characterising part of the independent claim directed to a method.

An arrangement according to the invention is characterised by the features recited in the characterising part of the independent claim directed to an arrangement.

An important aspect of the invention is the insight that reserving a bus is a dynamic process, the progress of which can be monitored by receiving feedback from the same lines through which the reservation attempt is effected. For a node, the question of whether the bus is free only becomes actual when it needs to use the bus. When that happens, a controller in the node activates an arbitration circuit the state of which directly depends on the present state of the arbitration lines. If they show that the bus is currently reserved, the arbitration circuit waits but remains active unless the controller cancels the activation. As soon as the arbitration lines assume a state indicating the bus to be free, the arbitration circuit cuts one of the arbitration lines, connects one side of it to a fixed potential and listens to the other side. If also the other side assumes said fixed potential, some other node on that side with higher priority made a simultaneous reservation, and the lower-priority node must interrupt its reservation attempt and cede the bus. If, however, said other side of the cut arbitration line remained intact long enough for the reserving node to send a reservation signal on the other arbitration line, that will keep all other nodes (regardless of priority) from intervening, and the reservation attempt has succeeded.

Even if the bus itself is digital, the changes in line voltages during the reservation attempt are fundamentally analogue phenomena and involve certain characteristic time constants and slope values. If there are several nodes waiting for the bus to become free, which of them gets to reserve the bus next depends on their mutual locations along the priority line but also on the speed at which the arbitration circuit reacts to the bus becoming free. Placing the nodes into a certain order along the priority line implements so-called geographical prioritization, but the invention does not exclude equipping nodes with differently tuned arbitration circuits in order to implement inherent node-specific prioritization regardless of location.

A specific internal structure of the arbitration circuit allows the controlling unit to use the same line between it and the arbitration circuit both for conveying the activation/deactivation commands and for receiving feedback about whether the reservation attempt succeeded or not. This is especially advantageous if the controller is of a kind that allows dynamically configuring pins as input or output pins according to need.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

FIG. 1 was discussed earlier in the description of prior art.

DETAILED DESCRIPTION OF THE INVENTION AND ITS ADVANTAGEOUS EMBODIMENTS

Figure 2:
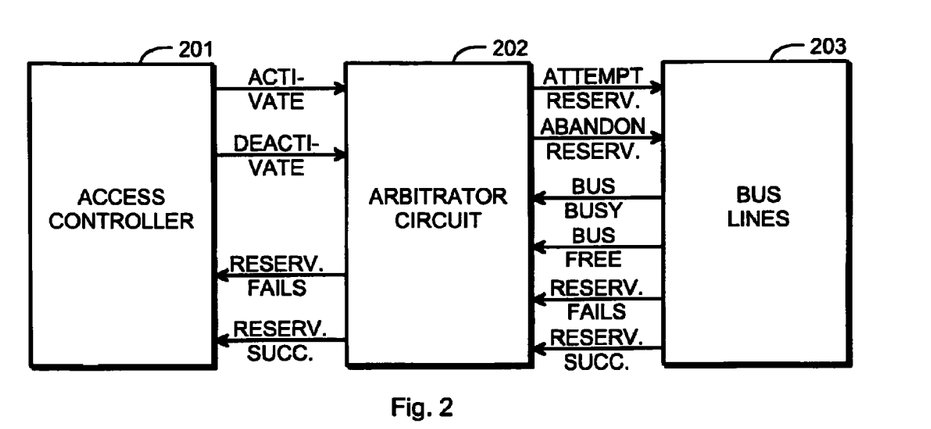
FIG. 2 illustrates an architectural principle according to an embodiment of the invention.

FIG. 2 illustrates an architectural division into an access controller 201, an arbitration circuit 202 and the bus lines 203. A part of the functionality of the access controller 201 is to send commands to and receive responses from the arbitration circuit 202 in the purpose of gaining access to a bus, at least a part of which is constituted by the bus lines 203. A circuit element that performs the functions of an access controller may well have other functionalities. Typically in a modular embedded system the functions of an access controller are performed by an MCU (MicroController Unit). The invention does not require there to be any literally separate entity acting as an arbitrator circuit, because especially when there is an MCU or some other programmable device acting as an access controller, the arbitration functions can be part of the functionality of the same programmable device. However, in order to give an illustrative description of the invention and its advantageous embodiments, it is helpful to assume that the arbitrator circuit is a separate entity.

According to the principle of FIG. 2, the access controller 201 is configured to selectively give an activation command or a deactivation command to the arbitration circuit 202. As responses, the arbitration circuit 202 is configured to give indications of a failure or a success in an attempted reservation of the bus.

Several interactions may take place between the arbitration circuit 202 and the bus lines 203. The arbitration circuit 202 is configured to subject the bus lines 203 to a reservation attempt. Additionally the arbitration circuit 202 is configured to abandon an ongoing reservation attempt if needed. In the other direction, the arbitration circuit 202 is configured to receive from the bus lines 203 indications of the bus being busy and the bus being free. Additionally the arbitration circuit 202 is configured to receive from the bus lines 203 indications about whether an attempted reservation succeeded or failed. The mere number of arrows drawn in FIG. 2 should not be confused with the actual required number of physical connections. For example, later we will show how all four interactions between the access controller 201 and the arbitrator circuit 202 may go through a single, common signal line.

Figure 3:
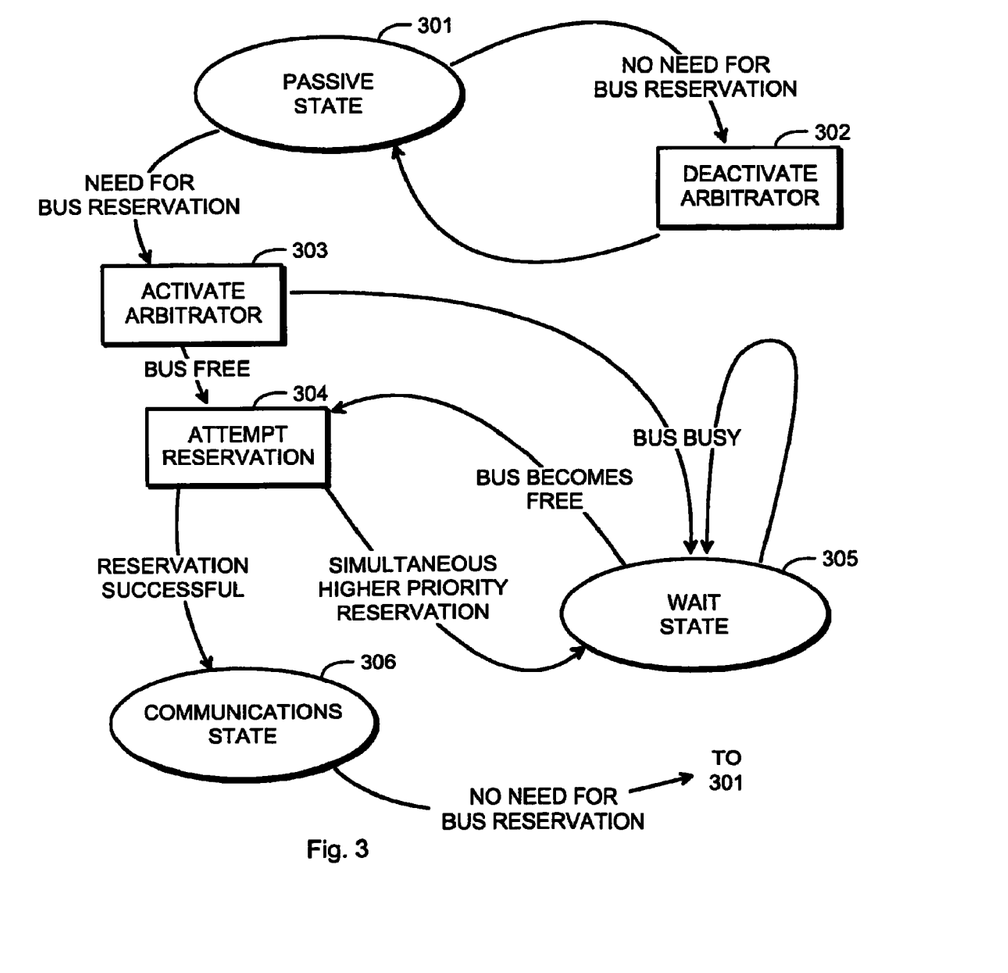
FIG. 3 illustrates a method according to an embodiment of the invention in the form of a state diagram.

FIG. 3 is a state diagram that illustrates a method for performing bus arbitration according to an embodiment of the invention. We must note that in the strictest meaning of the word, the method of FIG. 3 covers also more than just arbitration: if the reservation of the bus is attempted at some moment of time when the bus is free and there are no simultaneous reservation attempts from other nodes, there will not be any need for actual arbitration. However, since the concepts of simply reserving the bus on one hand and arbitrating with competing nodes on the other hand are closely interwoven in implementations according to embodiments of the present invention, for reasons of conciseness it is advantageous to simply speak about arbitration when we mean accessing the bus in a way that inherently excludes conflicts of reservation. States appear as ellipses in the state diagram of FIG. 3, actions appear as rectangles, and triggering conditions appear as plain text.

When there is no need to reserve the bus, the system is conceptually in a passive state 301 and the arbitrator circuit is deactivated as in action 302. When a need for reserving the bus occurs, the arbitrator circuit is activated according to action 303. If the bus is currently free, the arbitrator circuit attempts reservation immediately according to action 304. However, if the arbitrator circuit, once activated, notes that the bus is busy already, it does not even attempt to reserve the bus but there occurs a transition to a wait state 305. The system remains in the wait state 305 as long as the bus remains busy. When the arbitrator circuit notes that the bus has become free, it immediately attempts to reserve the bus.

From an attempted reservation of the bus at action 304 there are two possible outcomes. In a positive case the reservation attempt is successful and there occurs a transition to a communications state 306, in which the bus is available for use by the node that reserved it. The other alternative is that there is a simultaneous reservation attempt from a node that has higher priority. In that case there occurs again a transition to the wait state 305.

From the communications state 306 the system returns to the passive state 301 when there is no need anymore to keep the bus reserved.

Figure 4:
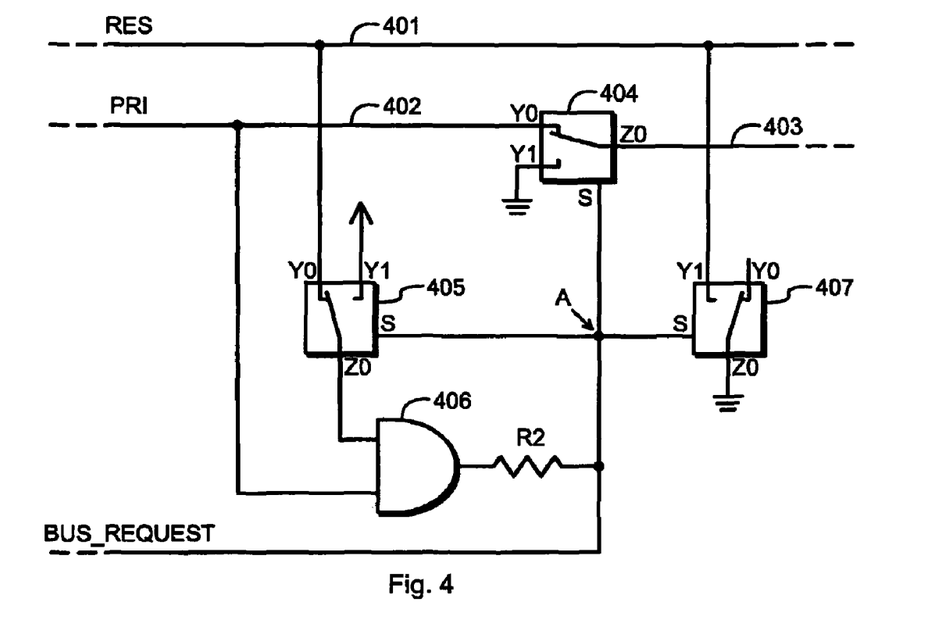
FIG. 4 illustrates an arbitration circuit according to an embodiment of the invention.

FIG. 4 illustrates an arbitrator circuit according to an embodiment of the invention. There are two bus lines that have a role to play in arbitration: the RES line 401 and the PRI line. The RES line 401 continues directly from node to node, so that the arbitrator circuit of FIG. 4 only has certain couplings to the continuous RES line. The PRI line is divided into a left half 402 and a right half 403, between which there is an analog two-to-one multiplexer 404 configured to connect the right half 403 either to the left half 402 or to a fixed "low" potential, which here is the ground potential but which could be also some other, predetermined potential.

There are two other analog two-to-one multiplexers in the arbitrator circuit of FIG. 4. Multiplexer 405 is configured to make a connection from either the RES line 401 or a fixed "high" potential to one input of a logic gate arrangement, which in this embodiment consists of a single AND gate 406. There is a connection from the left half 402 of the PRI line to another input of the AND gate 406. Multiplexer 407 is configured to make a connection from either an empty input or the RES line 401 to the fixed "low" potential. A control input of each of the multiplexers 404, 405, and 407 is connected to a common point, designated as point A in FIG. 4. A BUS_REQUEST signal line connects an assumed BUS_REQUEST pin of an access controller (not shown in FIG. 4) to point A. The output of the AND gate 406 is coupled to the BUS_REQUEST signal line through a resistor R2. Since the switching functions of the multiplexers 404, 405, and 407 could also be implemented in other ways, like using an array of simple on/off switches, for the sake of generality we may designate the functionality implemented with multiplexers in FIG. 4 as a switching arrangement.

The bus is reserved when at least one of the RES and PRI lines is at the fixed "low" potential, which in the continuation will be called the low voltage for short. The arbitrator circuit is only allowed to attempt reserving the bus when both RES and PRI lines are at the fixed "high" potential, which in the continuation will be called the high voltage for short.

When there is no need to reserve the bus, the access controller keeps its BUS_REQUEST pin and consequently also point A at a forced low voltage. This means that the PRI line continues directly from the left half 402 to the right half 403, and the arbitrator circuit does not essentially affect the potential of the RES line, because both multiplexers 404 and 407 connect their respective Y0 pin to their respective Z0 pin. Additionally, since the multiplexer 405 also connects its Y0 pin to its Z0 pin, the AND gate 406 is configured to monitor the potentials of the RES and PRI lines. Note that even if both RES and PRI lines are at high voltage (signifying that the bus is free), the resulting high voltage at the output of the AND gate 406 does not affect the control inputs of the multiplexers 404, 405, and 407, because the access controller forces the BUS_REQUEST line low; a potential difference will occur over the resistor R2.

When the access controller wants to activate the arbitrator circuit, it switches its BUS_REQUEST pin from forced low voltage to high impedance. What now happens to the potential of point A depends on the voltages of the RES and PRI lines. If at least one of them is at low voltage, signifying a reserved bus, the output of the AND gate 406 stays low and the multiplexers 404, 405, and 407 remain in the position shown in FIG. 4. This corresponds to a transition from action 303 to state 305 in FIG. 3: the system goes into wait state without even attempting to reserve the bus. During the wait state the access controller does not affect the potential of point A, because the BUS_REQUEST pin is at high impedance, but point A is kept at low voltage by the AND gate 406.

The other straightforward alternative is the case in which both the RES and PRI lines are at high voltage when the access controller activates the arbitrator circuit. The output of the AND gate 406 is high, so it raises the potential of point A to high voltage because the BUS_REQUEST line does not force it low any more. The same happens if the system has been in the wait state and the RES and PRI lines both assume high voltage, signifying the bus becoming free, which ends the wait state. The multiplexers 404, 405, and 407 see a high voltage in their respective control inputs, which causes them to change state and connect their respective Y1 pin to their respective Z0 pin. This causes the following three effects:
1) The left half 402 of the PRI line is disconnected from the right half 403, and the right half 403 is connected to low voltage at multiplexer 404.
2) The RES line 401 is connected to low voltage at multiplexer 407.
3) The upper output of the AND gate 406 is disconnected from the RES line 401 and connected to high voltage instead at multiplexer 405.

In the resulting situation the output of the AND gate 406 is high if the PRI line is at high voltage. Since we assumed above that this is now indeed the case, point A is and remains also at high voltage and the bus reservation has succeeded. No other node can seize the bus after the potential of point A has stabilised at high voltage, because all other nodes will see the RES line at low voltage, which keeps them from attempting reservation. Now the system is at the communications state 306 f FIG. 3. When the bus reservation is not needed any more, the access controller will force the BUS_REQUEST line to low voltage again, which overrides the high voltage given by the AND gate 406 due to resistor R2, and the system returns to the passive state.

Now let us analyse, what happens if the bus is free to begin with (or becomes free after a previous reservation), and two nodes happen to attempt reserving the bus simultaneously. In other words, in both nodes the BUS_REQUEST line goes to high impedance at exactly the same moment. Since in both competing arbitration circuits the output of their respective AND gates raises the potential of point A to high voltage, the multiplexers switch from Y0 to Y1. This connects the RES line to low voltage (even at two separate locations) and makes the AND gate of both arbitration circuits follow the potential of the PRI line at the point at which they see it. If the other competing node is to the left from the one the arbitration circuit of which is seen in FIG. 4, the AND gate 406 seen in FIG. 4 sees the left half 402 of the PRI line connected to low voltage. This causes the output of the AND gate 406 to also assume low voltage. As a consequence the multiplexers 404, 405, and 407 return to their Y0 switching state and the reservation attempt fails. In FIG. 3 this corresponds to a transition from action 304 to state 305 through condition "simultaneous higher priority reservation".

If the other competing node was to the right of the one the arbitration circuit of which is seen in FIG. 4, the AND gate 406 now sees the left half 402 of the PRI line remaining at high voltage. As a consequence, also the output of the AND gate 406 and point A remain at high voltage, and the reservation attempt succeeds. The other competing node will abort its reservation attempt, because it sees the PRI line connected to low voltage at multiplexer 404. This explanation of arbitration between two competing nodes is easily generalised to an arbitrary number of nodes attempting reservation simultaneously: the node that will succeed in reserving the bus is the leftmost one in respect of the PRI line. This means geographical prioritization. Naturally the directional terms "left" and "right" are used only as illustrative examples that refer to the pictorial representation in FIG. 4. We assume that there is a pull-up resistor at the "leftmost" end of the PRI line only, so a more appropriate description of the geographical prioritization would characterise the winning node as being the one among the competing nodes that is closest to the pull-up resistor along the PRI line.

Comparing FIGS. 2 and 4, we note that the four interactions between the access controller 201 and the arbitrator circuit 202 in FIG. 2 all take place through a single signal line in FIG. 4. Activating the arbitrator circuit takes place when the access controller couples the pin connected to the BUS_REQUEST line to high impedance, and deactivating the arbitrator circuit takes place when the access controller forces said pin to low voltage. While said pin is at high impedance, the arbitrator circuit may announce a failed reservation attempt with a low voltage on the BUS_REQUEST line and a successful reservation attempt with a high voltage on the BUS_REQUEST line. The six interactions between the arbitrator circuit 202 and the bus lines 203 in FIG. 2 take place through the couplings between the arbitrator circuit and the RES and PRI lines in FIG. 4. Attempting reservation means that the arbitrator circuit couples the RES line to low voltage as well as disconnects the PRI line and couples its right half to low voltage. Abandoning a reservation attempt means that these couplings are cancelled. The arbitrator circuit receives a "bus busy" signal by noting a low voltage in at least one of the RES and PRI lines, and a "bus free" signal by noting a high voltage in both of them. During an attempted reservation the arbitrator circuit received an indication of a failure as a low voltage on the left half of the PRI line, and an indication of success as a high voltage on the same.

Figure 5:
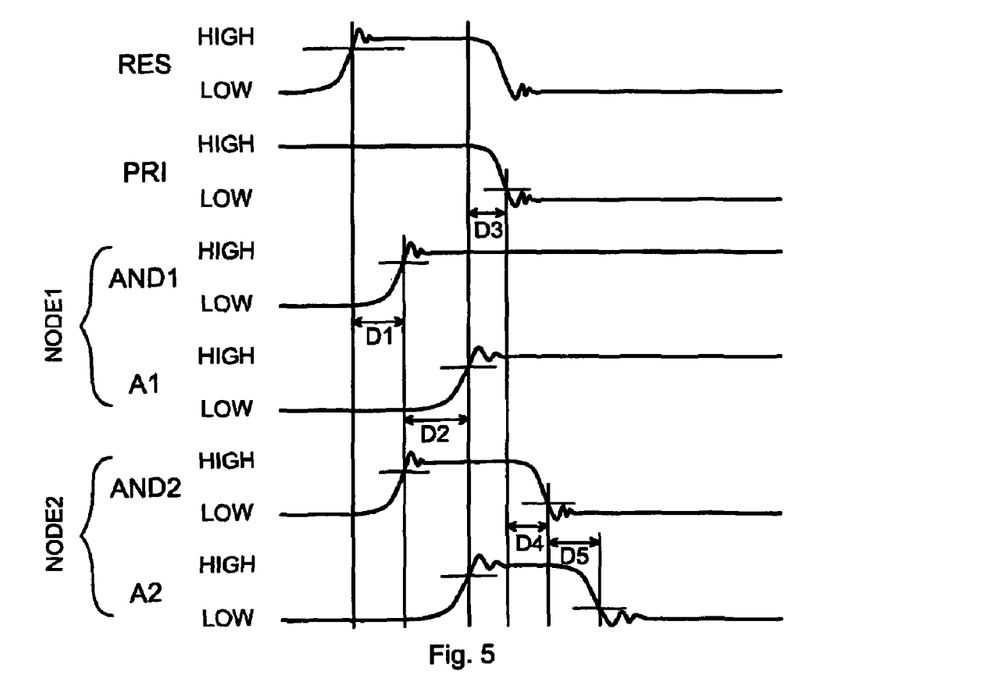
FIG. 5 illustrates a timing diagram related to the operation of an arrangement according to an embodiment of the invention.

FIG. 5 is a schematic timing diagram that illustrates certain delays that are involved in an arbitration situation. We assume that there will be two competing nodes trying to reserve the bus simultaneously after a third node to the right of both of them releases the bus. In the beginning of the timing diagram the RES line is at low voltage, signifying the reservation of said third node. Both competing nodes see the PRI line at high voltage, because the previous reservation was made to the right of both of them. The PRI curve in FIG. 5 illustrates the potential of that section of the PRI line that is between the competing nodes.

When the third node releases the bus, the potential of the RES line begins to rise towards the high voltage. At some point of time it has reached a voltage that the AND gates consider to be a logical "1", which causes the AND gates to swing their output from low voltage to high voltage. A practical circuit element will cause a delay in the propagation of the signal. FIG. 5 illustrates as D1 the delay from the moment at which the RES-connected input of an AND gate reached logical "1" to the moment at which the output of the AND gate reaches logical "1". Since there is an AND gate in both competing nodes, FIG. 5 separately shows the output of the AND gate in the first node as AND1 and the output of the second node as AND2. We assume that both nodes have identical arbitration circuits, so the delay D1 is the same for both nodes.

The resistor coupled to the output of the AND gate, as well as the capacitances and inductances involved in controlling the multiplexers, cause an additional delay so that if we designate as A1 the potential that determines the switching position of a multiplexer in the first node (and correspondingly as A2 the potential that determines the switching position of a multiplexer in the second node), we note that between the moment at which the output of the AND gate reaches logical "1" and the moment at which the multiplexers begin changing their switching state there is a delay D2. We assume that the capacitances and inductances cause the potential A1 to change generally slower than the output of the AND gate; hence the smaller slope of the A1 and A2 curves compared to AND1 and AND2.

The multiplexer introduces an additional delay. Between the moment of time when the multiplexer that is to disconnect the PRI line in the first node receives the logical "1" of signal A1 and the moment of time when the right half of the PRI line at that node reaches logical "0" there is a delay D3. We assume that the first node is the leftmost of these two, which means that severing the PRI line in the first node and connecting its right half to ground causes the second node to see the PRI line swing to low voltage. This signal propagates to the output of the AND gate in the second node in delay D4, and the A2 signal that drives the multiplexers in the second node reaches logical "0" after an additional delay D5. As a result of the arbitration, the RES and PRI lines are both at low voltage, which signifies a reserved bus. The AND2 and A2 potentials are also both at low voltage, which means that the second node has lost the arbitration and aborted the reservation attempt. The AND1 and A1 potentials are both at high voltage, which means that the first node has won the arbitration and succeeded in reserving the bus.

The arbitrator circuit can be implemented with two common low cost logic ports. The circuit 74xx4053 contains three two-to-one analog multiplexers, and the circuit 74xx1G08 contains a two-input AND gate. The selection of logic family has an effect on the delays that are involved in the arbitration process. In a test arrangement with a 74HC4053 multiplexer circuit and a 74HC1G11 three-input AND gate (see FIG. 6 and the associated description later in this text), and a 10 k resistor at the output of the AND gate, a total delay D1+D2+D3=1.79 microseconds has been observed. If the access controller is an MCU that includes some programmable logic in the same package, the arbitration circuit can be implemented using said programmable logic.

Figure 6:
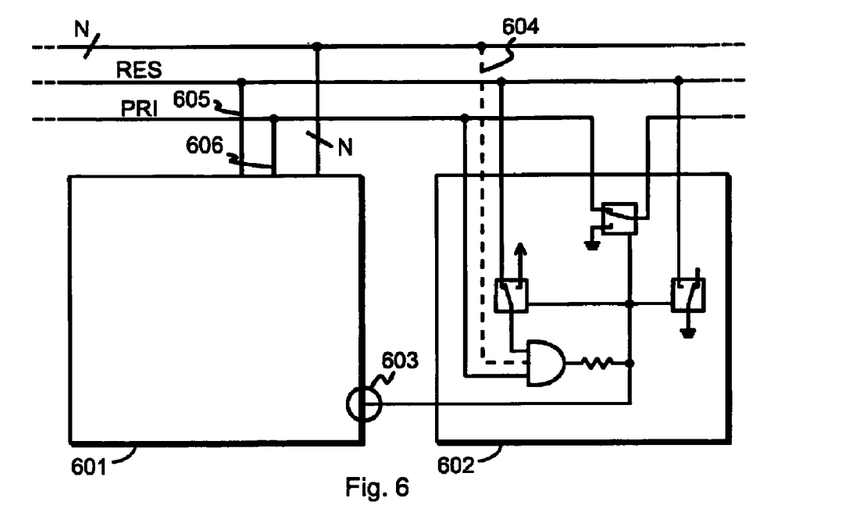
FIG. 6 illustrates connections in a device according to an embodiment of the invention.

FIG. 6 illustrates some aspects of line use and re-use. We assume that there is a bus the width of which is N+2 lines, where N is a non-negative integer. A node comprises an MCU 601, which acts as the access controller, and an arbitrator circuit 602. A pin 603 of the MCU is one which the MCU can utilise as an input or as an output according to need. In input mode the impedance of the pint 603 is high and has essentially no effect on the logic that it is connected to, but it can read the voltage levels. This property is used when monitoring the success of arbitration: if the node succeeds to reserve the bus, the MCU 601 senses a persistent high voltage at pin 603. If the reservation attempt fails, the MCU 601 senses a low voltage at pin 603 after a brief swing to a high voltage. If the MCU wants to use an observed voltage reading at pin 603 to determine, whether it has successfully reserved the bus, it must therefore make its decision only after obtaining two consecutive readings with a time interval between them that is longer than the time during which the voltage of point A in FIG. 4 is temporarily high during a failing bus reservation attempt. If both readings indicate a high voltage, bus reservation has succeeded. The required minimum length between two readings is equal to the sum of the delays D3+D4+D5 in FIG. 5, and in the test arrangement referred to earlier it was found to be 1.79 microseconds just like the delay from freeing the bus to the next reservation.

In output mode the pin 603 sources or drains enough current to force the logic voltages to required state. This property is used to deactivate the arbitrator circuit 602 when there is no need to reserve the bus. In particular in this solution the pin 603 must drain at least as much current as flows through the resistor at the output of the AND gate when the output voltage of the AND gate is high. The role of the resistor at the output of the AND gate is two-fold: for one hand it reduces the current that pin 603 must drain in order to keep the BUS_REQUEST line at low voltage, and for the other hand it weakens the effect of the output of the AND gate on the control signal given to the multiplexers, so that we can be sure that the output of the AND gate can always be overridden by pin 603 if needed in determining the effective value of the control signal. The interaction between the MCU 601 and the arbitrator circuit 602 could also be designed so that the former could tell the latter to disconnect the output of the AND gate from the control inputs of the multiplexers (and from pin 603) altogether during times when the arbitrator circuit is not needed. In such an alternative solution there would be two clearly separate and mutually exclusive sources for the control signal to be delivered to the multiplexers.

The bus may contain also other lines that affect bus reservation than the RES and PRI lines. For example, a primary master of the bus may have a reset line at its disposal with which it may keep all other nodes from reserving the bus and even cancel current reservations. An easy way to couple such lines to the arbitrator circuit is to use an AND gate that has more than two inputs, and to make a connection from all required lines of the bus to the AND gate in the arbitrator circuit. FIG. 6 shows a line 604 coupled this way. A low voltage at line 604 will force the output of the AND gate low, and thus keep the arbitrator circuit 602 from reserving the bus. A high voltage at line 604 will let the arbitrator circuit 602 perform bus reservation attempts as has been described earlier.

An important advantage of the arbitrator circuit according to the invention is that it enables re-using the RES and PRI lines for other purposes, contrary to prior art daisy chain type arbitration solutions that require an unidirectional priority line. The extent to which this is possible depends partly on the bus protocol that is used. The RES and PRI lines constitute analog and bi-directional connections to all nodes all the time except during arbitration. Thus they can be used as normal data lines when the arbitration procedure is not in progress. This is illustrated in FIG. 6 with direct connections 605 and 606 from the RES and PRI lines to the MCU 601 respectively.

The strictly geographic priority among nodes could be considered a drawback, because it does not allow changing priorities dynamically. Since all nodes that are connected to the same RES and PRI lines react in the same way, the switch that connects or disconnects the PRI line will disconnect simultaneously in all competing nodes, after which the leftmost node wins. However, if the nodes would react to the bus becoming free with different delays, that would have an effect on priority.

Figure 7:
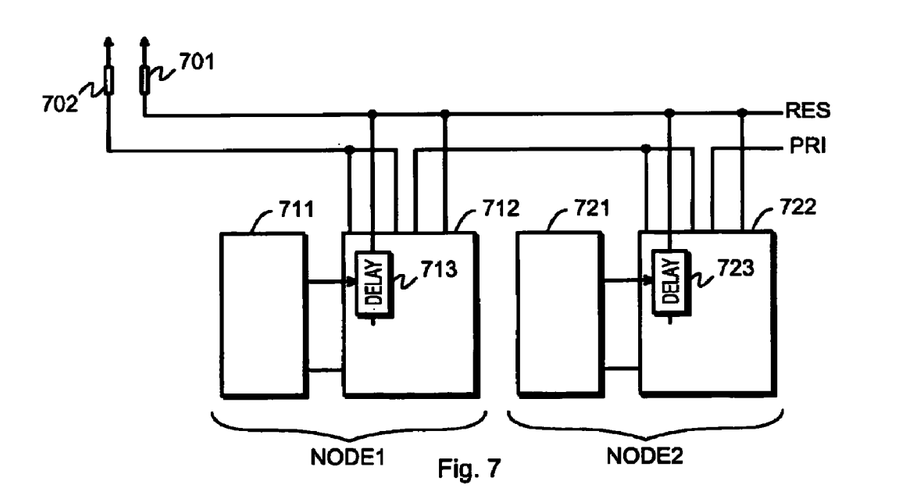
FIG. 7 illustrates the possible use of controllable delay elements according to an embodiment of the invention.

FIG. 7 illustrates schematically an arrangement in which a first node and a second node are connected to a bus. For simplicity, only the RES and PRI lines of the bus are shown. For the sake of record, FIG. 7 also illustrates at the leftmost end of each of said lines the pull-up resistors 701 and 702 that keep the RES and PRI lines at high voltage when the bus is free. Each node has an access controller 711, 721 and an arbitrator circuit 712, 722. The arbitrator circuits are assumed to follow the topology illustrated in FIGS. 4 and 6 except the addition of a controllable delay element, the purpose of which is to introduce delay to the way in which the arbitrator circuit reacts to changes in the potential of at least one bus line.

As an example, we may assume that the delay element 713 is coupled between the RES line and the multiplexer (not separately shown) that is configured to couple either the RES line or the fixed high voltage to an input of the AND gate (not separately shown); using the designations of FIG. 4 the delay element would be between the RES line 401 and the Y0 input of multiplexer 405. Similarly in the second node there is a delay element 723 coupled between the RES line and the multiplexer (not separately shown) that is configured to couple either the RES line or the fixed high voltage to an input of the AND gate (not separately shown).

Another possibility to introduce controllable delay would be to replace the resistor at the output of the AND gate (see resistor R2 in FIG. 4) with a digital potentiometer or some other circuit element with controllable resistance. Since the time it takes to transform a high voltage at the output of the AND gate to an actual switching function in the multiplexers is at least partly a function of the resistance therebetween, changing the resistance will also change the delay. A person skilled in the art can easily come up with even more alternative ways of implementing a controllable delay in the arbitrator circuit.

If we assume that the delay elements 713 and 723 implement an equal delay, the situation does not change from that of FIG. 5 except that the delay from the RES line voltage going high to the AND gate output voltages going high becomes longer, because the delay caused by the delay elements 713 and 723 adds up with the inherent delay D1 it takes for an AND gate to react. However, if the delay implemented by delay element 713 in the first node is longer than the delay implemented by delay element 723 in the second node by an amount that is equal to or greater than the sum D1+D2+D3 in FIG. 5, the second node makes it to pulling the voltages of the RES and PRI lines low before the AND gate in the first node even starts reacting. At that point the AND1 signal cannot go high any more, because the AND gate in the first node already receives a low voltage input from the PRI line.

Figure 8:
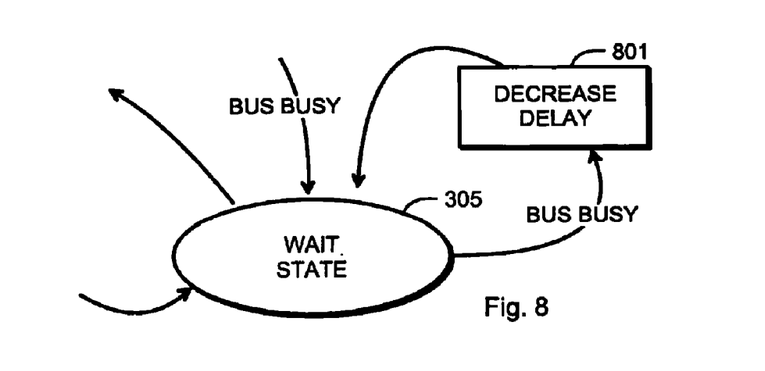
FIG. 8 illustrates a possible modification to the state diagram of FIG. 3.

If the delay elements 713 and 723 had fixed, different values and were not controllable, this kind of delay-governed priority could only be used to make the nodes of the modular device act according to a priority scheme on the bus that is fixed but not necessarily geographic. However, assuming that each of the access controllers 711 and 721 is configured to control the amount of delay caused by the delay elements 713 and 723, much more flexibility is obtained. The priorities of nodes can be changed dynamically to accommodate for example the changing relative importance of nodes coupled to the bus. One possibility is to make priority depend on the length of time that a node has been in the wait state, waiting for the bus to become free. FIG. 8 illustrates schematically a small change to a part of the state diagram of FIG. 3: if the system must spend time in the wait state 305, it repetitively circulates through action 801 and makes the delay to be applied to RES voltage detection gradually smaller. This way a node that has waited for a long time for the bus to become free may have better chances to succeed in its next reservation attempt even if geographically it would have low priority. Both fixed and controllable delay elements are widely known in the technical field of electronic components.

In implementations where it is desirable to keep the actual arbitrator circuit as simple as possible, like that shown in FIG. 4 without any additional delay elements, it is possible to use the built-in programmable logic or other parts of the MCU to implement the required delay. In such a case, using the designations of FIG. 4, the Y0 input of multiplexer 405 would not come directly from the RES line but it would make a sidetour through the MCU, where the appropriate (preferably controllable) delay would be implemented.

The exemplary embodiments of the invention discussed above should not be construed as excluding alternative implementations. For example, even if we have continuously referred to arbitration-related bus lines that are at high voltage when the bus is free, it is perfectly possible to apply the same principles with arbitration-related bus lines at least some of which are at low voltage when the bus is free. This would necessitate simply reversing also the definitions of other signals and using an OR gate instead of the AND gate, and/or using inverters at suitable points to invert the necessary signals inside the arbitrator circuit. The switching functions that are implemented with two-to-one multiplexers in the exemplary embodiments could also be implemented with more distributed switching arrangements. For example the multiplexer that severes the PRI line could be replaced with two separate switches, one to actually severe the PRI line and another to connect one of the remaining PRI halves to a fixed potential. The two multiplexers used to replace the connection from the RES line to the AND gate with a fixed potential input to the AND gate and to connect the RES line to a fixed potential could be combined to a single four-port switching arrangement that would perform the same functions. The comparing and output signal forming functionality that has been illustrated as one logic (AND) gate could also be implemented in various more distributed ways.

Figure 9:
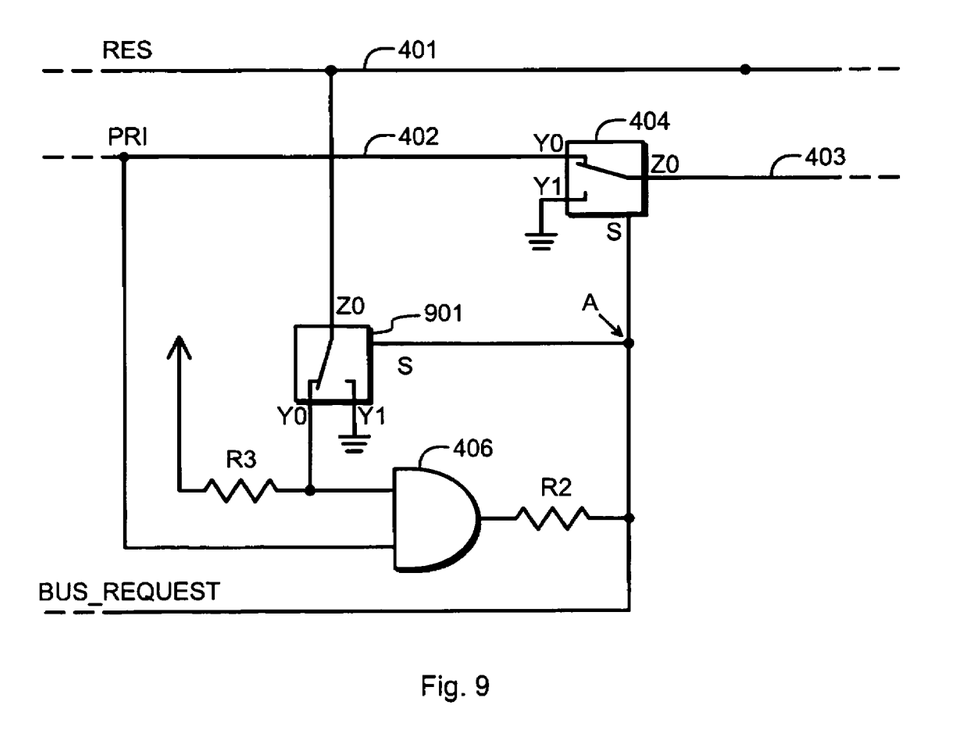
FIG. 9 illustrates an alternative way of implementing the switching arrangement.

FIG. 9 illustrates an alternative way of implementing the switching arrangement. In this case the switching arrangement comprises only two analog two-to-one multiplexers 404 and 901. There is a fixed coupling from the upper input of the AND gate 406 to high voltage through a pull-up resistor R3. The Y0 pin of the multiplexer 901 is connected to a point between the pull-up resistor R3 and said upper input of the AND gate 406, and the Y1 pin is connected to ground. The Z0 pin of the multiplexer 901 is connected to the RES line 401. When the BUS_REQUEST line is at forced low voltage, there is a connection from the RES line 401 through multiplexer 901 to the upper input of the AND gate 406, and the potential of the RES line 401 thus overrides the effect of the coupling to high voltage through resistor R3 (the resistance of resistor R3 must be large enough to allow such over-riding). When the arbitrator circuit is activated, a high voltage at point A obtained from the output of the AND gate 406 will make multiplexer 901 connect Z0 to Y1 instead, so that there will be a connection from the RES line 401 to ground and from high voltage through resistor R3 to the upper input of the AND gate 406. Multiplexer 901 and the pull-up resistor R3 thus replace the arrangement of two multiplexers 405 and 407 in FIG. 4.

Following the principle illustrated by FIG. 9, in many locations of the arbitrator circuit it is possible to replace alternative switching to either a first or a second circuit point with arrangements where a fixed coupling through a "damper" resistor exists, and is overridden when necessary with some other, less damped effect coming from another source, or vice versa. For example, it could be possible to replace multiplexer 404 with a resistor that connects the two halves of the PRI line, and a switch that would controllably connect the right half directly (or through a much smaller resistance) to ground. In this sense, expressions like "disconnecting" or "decoupling" should be understood to mean that a coupling is either severed altogether or overridden with a more direct and more influential coupling. Similarly "connecting" or "coupling" do not necessarily mean that a completely new connection is created, but the influence of a certain coupling can be increased for example making its resistance significantly smaller, or the effect of some more influential coupling can be removed so that as a result, a weaker source becomes decisive and is thus "coupled" to the signal point in question.

The invention claimed is:

1. A circuit for performing arbitration when accessing a bus, comprising a logic gate arrangement (406) having a first input, a second input and an output, and configured to have a coupling from a first bus line to said first input, characterized in that:
   the circuit comprises a switching arrangement (404, 405, 407, 901) configured to respond to a control signal by
      disconnecting a first half (402) of the first bus line from a second half (403) of the first bus line and coupling said second half (403) to a first fixed potential, said first half (402) being the one coupled to the first input of the logic gate arrangement (406),
      decoupling a second bus line (401) from the second input of said logic gate arrangement (406) and allowing the potential of said second input to become essentially equal with a second fixed potential, and coupling said second bus line to said first fixed potential; and
   two sources are available for providing the control signal to the switching arrangement (404, 405, 407, 901), and one of said two sources is the output of the logic gate arrangement (406).

2. A circuit according to claim 1, characterized in that the other of said two sources is a signal line from outside said circuit to said switching arrangement (404, 405, 407, 901).

3. A circuit according to claim 2, characterized in that the output of the logic gate arrangement (406) is coupled to said signal line through a resistor (R2) for making the effect of the output of the logic gate arrangement (406) on a voltage value of the control signal weaker than the effect of a voltage coupled to said signal line from outside said circuit.

4. A circuit according to claim 1, characterized in that said switching arrangement (404, 405, 407) comprises three analog two-to-one multiplexers responsive to the control signal, of which:
   a first multiplexer (404) is configured to selectively connect the second half (403) of the first bus line to the first half (402) of the first bus line or to said first fixed potential, depending on whether the control signal has a first value or a second value respectively, a second multiplexer (405) is configured to selectively connect the second input of said logic gate arrangement (406) to the second bus line (401) or to said second fixed potential depending on whether the control signal has said first value or said second value respectively, and a third multiplexer (407) is configured to selectively connect the second bus line (401) to nothing or to said first fixed potential depending on whether the control signal has said first value or said second value respectively.

5. A circuit according to claim 4, characterized in that the logic gate arrangement (406) consists of an AND gate configured to give a voltage representing a digital high level at its output when both the first half (402) of the first bus line and the output of the second multiplexer (405) are at a voltage representing a digital high level.

6. A circuit according to claim 1, characterized in that:
said switching arrangement (404, 901) comprises two analog two-to-one multiplexers responsive to the control signal, of which:
    a first multiplexer (404) is configured to selectively connect the second half (403) of the first bus line to the first half (402) of the first bus line or to said first fixed potential, depending on whether the control signal has a first value or a second value respectively, and
    a second multiplexer (901) is configured to selectively connect the second bus line (401) to the second input of said logic gate arrangement (406) or to said first fixed potential depending oh whether the control signal has said first value or said second value respectively, and
the second input of said logic gate arrangement (406) is coupled to the second fixed potential through a pull-up resistor (R3).

7. A circuit according to claim 1, characterized in that it comprises a delay element (713, 723) configured to lengthen the time it takes for a change in a potential of at least one of the first half (402) of the first bus line and the second bus line (403) to cause a change in a signal delivered from the output of the logic gate arrangement (406) to the switching arrangement (404, 405, 407).

8. A circuit according to claim 7, characterized in that said delay element (713, 723) is a controllable delay element configured to change the amount of delay it causes in response to a delay control signal.

9. An arrangement for performing arbitration when accessing a bus, comprising an access controller (201, 601, 711, 721) and an arbitrator circuit (202, 602, 712, 722), characterized in that the arbitrator circuit (202, 602, 712, 722) is a circuit according to claim 1.

10. An arrangement according to claim 9, characterized in that the access controller and the arbitrator circuit are parts of a microcontroller, the arbitrator circuit being implemented with programmable logic that is included in the microcontroller.

11. An arrangement according to claim 9, characterized in that the other of said two sources available for providing the control signal to the switching arrangement is a connection between the arbitrator circuit and the access controller.

12. An arrangement according to claim 11, characterized in that:
the access controller has a pin (603) that is dynamically configurable for use as an output pin or an input pin,
said connection between the arbitrator circuit and the access controller goes through said pin (603),
the access controller is configured to selectively activate the arbitrator circuit by dynamically configuring said pin (603) for use as an input pin with high impedance, and
the access controller is configured to selectively deactivate the arbitrator circuit by dynamically configuring said pin (603) for use as an output pin and by forcing said pin (603) to a voltage representing a digital low level.

13. An arrangement according to claim 9, characterized in that:
the arrangement comprises a controllable delay element (713, 723) configured to lengthen the time it takes for a change in a potential of at least one of the first half (402) of the first bus line and the second bus line (403) to cause a change in a signal delivered from the output of the logic gate arrangement (406) to the switching arrangement (404, 405, 407), and
the access controller is configured to change the amount of delay that the delay element (713, 723) causes, by delivering a delay control signal to the delay element (713, 723).

14. A method for performing arbitration when accessing a bus, characterized in that, as a response to an activation signal that indicates a need to reserve the bus and to an observation that a first bus line and a second bus line are both at a second fixed potential, it comprises:
disconnecting a first half (4b2) of the first bus line from a second half (403) of the first bus line,
coupling said second half (403) to a first fixed potential,
coupling the second bus line (401) to said first fixed potential, and
depending on the potential observed at the first half (402) of the first bus line,
    if the potential of the first half (402) is essentially equal to the second fixed potential, indicating a successful bus reservation, or
    if the potential of the first half (402) is essentially equal to the first fixed potential, indicating a failed bus reservation, reconnecting the first half (402) of the first bus line to the second half (403) of the first bus line, decoupling said second half (403) from the first fixed potential, and decoupling the second bus line (401) from said first fixed potential.

15. A method according to claim 14, characterized in that as a response to an activation signal that indicates a need to reserve the bus and to an observation that at least one of the first bus line and the second bus line are at the first fixed potential, it comprises waiting until the first bus line and the second bus line are both at the second fixed potential and thereafter performing the steps of claim 13.

16. A method according to claim 15, characterized in that after said waiting, as a response to the first bus line and the second bus line both having the second fixed potential, the method comprises waiting for the duration of an additional delay before performing the steps of claim 14.

17. A method according to claim 16, characterized in that it comprises decreasing a default value of said additional delay as a function of the length of time spent waiting for the first bus line and the second bus line both to have the second fixed potential.

* * * * *